United States Patent
Seigler et al.

(10) Patent No.: US 9,165,591 B2
(45) Date of Patent: Oct. 20, 2015

(54) GRATING BASED LASER AND POWER MONITOR FOR A HEAT-ASSISTED MAGNETIC RECORDING DEVICE

(71) Applicant: Seagate Technology LLC, Cupertino, CA (US)

(72) Inventors: Michael Allen Seigler, Eden Prairie, MN (US); Delai Zhou, Maple Grove, MN (US)

(73) Assignee: SEAGATE TECHNOLOGY LLC, CUPERTINO, CA (US)

( * ) Notice: Subject to any disclaimer, the term of this patent is extended or adjusted under 35 U.S.C. 154(b) by 0 days.

(21) Appl. No.: 13/961,762

(22) Filed: Aug. 7, 2013

(65) Prior Publication Data

US 2015/0043317 A1 Feb. 12, 2015

(51) Int. Cl.
*G11B 11/00* (2006.01)
*G11B 11/105* (2006.01)

(52) U.S. Cl.
CPC .... *G11B 11/10595* (2013.01); *G11B 11/10515* (2013.01); *G11B 11/10554* (2013.01)

(58) Field of Classification Search
CPC ................ G11B 2005/0032; G11B 2005/0024
USPC ....................... 369/13.33, 13.13, 13.32, 13.26
See application file for complete search history.

(56) References Cited

U.S. PATENT DOCUMENTS

| | | |
|---|---|---|
| 4,674,100 A | 6/1987 | Kobayashi |
| 4,815,090 A | 3/1989 | Usami et al. |
| 5,410,622 A | 4/1995 | Okada et al. |
| 5,475,701 A | 12/1995 | Hibbs-Brenner |
| 5,491,712 A | 2/1996 | Lin et al. |
| 5,577,064 A | 11/1996 | Swirhun et al. |
| 6,404,959 B1 | 6/2002 | Te Kolste et al. |
| 7,085,300 B2 | 8/2006 | Werner et al. |
| 7,453,100 B2 | 11/2008 | Funabashi et al. |
| 7,898,909 B2 | 3/2011 | Shimazawa et al. |
| 7,936,643 B2 | 5/2011 | Takayama et al. |
| 8,116,171 B1 | 2/2012 | Lee |
| 8,134,794 B1 | 3/2012 | Wang |
| 8,149,653 B2 | 4/2012 | Shimazawa et al. |
| 8,194,509 B2 | 6/2012 | Shimazawa et al. |
| 8,200,054 B1 | 6/2012 | Li et al. |
| 8,238,202 B2 * | 8/2012 | Schreck et al. ............ 369/13.33 |
| 8,243,561 B2 | 8/2012 | Matsumoto |
| 8,248,892 B2 | 8/2012 | Shimazawa et al. |
| 8,248,898 B2 * | 8/2012 | Schreck et al. ............ 369/13.33 |
| 8,274,866 B2 * | 9/2012 | Sekine ....................... 369/13.33 |
| 8,369,191 B2 | 2/2013 | Shimazawa |
| 8,391,107 B2 | 3/2013 | Gage et al. |

(Continued)

FOREIGN PATENT DOCUMENTS

EP 0805528 11/1997

*Primary Examiner* — Tan X Dinh
(74) *Attorney, Agent, or Firm* — Hollingsworth Davis, LLC

(57) ABSTRACT

A head assembly includes a submount, a body with a first surface, an optical path, a near field transducer (NFT), a sensor, and a laser. The optical path is disposed in the body and is adapted to receive light and convey the light to a distal end of the waveguide. The near field transducer (NFT) is disposed adjacent the distal end of the waveguide and has an output end proximate the first surface of the body. The sensor interfaces with the submount and the laser is attached to the submount along a non-primary lasing surface. The laser is adapted to inject light into the waveguide and includes a grating adapted to diffract a portion of the light through the non-primary lasing surface to the sensor.

20 Claims, 8 Drawing Sheets

(56) References Cited

U.S. PATENT DOCUMENTS

| | | | |
|---|---|---|---|
| 8,406,090 B2 | 3/2013 | Juang et al. | |
| 8,432,781 B2 | 4/2013 | Knappmann et al. | |
| 8,437,229 B2* | 5/2013 | Seigler | 369/13.33 |
| 8,477,571 B1* | 7/2013 | Zhou et al. | 369/13.33 |
| 8,670,295 B1* | 3/2014 | Hu et al. | 369/13.33 |
| 2005/0122850 A1* | 6/2005 | Challener et al. | 369/13.24 |
| 2006/0039434 A1 | 2/2006 | Coleman | |
| 2006/0233061 A1 | 10/2006 | Rausch et al. | |
| 2008/0204916 A1* | 8/2008 | Matsumoto et al. | 360/59 |
| 2009/0225464 A1 | 9/2009 | Juang et al. | |
| 2011/0075526 A1* | 3/2011 | Sekine et al. | 369/13.24 |
| 2011/0122737 A1 | 5/2011 | Shimazawa et al. | |
| 2011/0128829 A1* | 6/2011 | Nishida et al. | 369/13.32 |
| 2011/0216635 A1 | 9/2011 | Matsumoto | |
| 2011/0228651 A1 | 9/2011 | Gage et al. | |
| 2011/0228652 A1 | 9/2011 | Gage et al. | |
| 2011/0228653 A1 | 9/2011 | Shimazawa et al. | |
| 2012/0008470 A1 | 1/2012 | Shimazawa et al. | |
| 2012/0134246 A1 | 5/2012 | Shimazawa | |
| 2012/0163137 A1 | 6/2012 | Wang et al. | |
| 2012/0201491 A1 | 8/2012 | Zhou | |
| 2012/0257488 A1 | 10/2012 | Knappmann et al. | |
| 2012/0327754 A1 | 12/2012 | Olson | |
| 2013/0135975 A1 | 5/2013 | Gage et al. | |
| 2013/0322822 A1* | 12/2013 | Roeger et al. | 385/36 |

\* cited by examiner

GRATING BASED LASER AND POWER MONITOR FOR A HEAT-ASSISTED MAGNETIC RECORDING DEVICE

SUMMARY

Examples described herein are directed to a heat-assisted magnetic recording device with improved power monitoring capability. In one embodiment, a head assembly is disclosed; the assembly includes a submount, a body with a first surface, an optical path, a near field transducer (NFT), a sensor, and a laser. The optical path is disposed in the body and is adapted to receive light and convey the light to a distal end of the waveguide. The near field transducer (NFT) is disposed adjacent the distal end of the waveguide and has an output end proximate the first surface of the body. The sensor interfaces with the submount and the laser is attached to the submount along a non-primary lasing surface. The laser is adapted to inject light into the waveguide and includes a grating adapted to diffract a portion of the light through the non-primary lasing surface to the sensor.

In another embodiment, a heat assisted magnetic recording device is disclosed; the device includes a slider body, a read/write element, a submount, a photodiode, and a laser. The read/write element is disposed proximate the slider body and is configured to apply a magnetic field to write data on a portion of a heat-assisted magnetic recording medium in response to an energizing current. The submount is attached to the slider body and the photodiode interfaces with the submount. The laser is attached to the submount and is disposed to cover the photodiode. The laser is adapted to inject light to proximate the read/write element and includes a grating adapted to diffract a portion of the light to the photodiode.

In yet another embodiment a method is disclosed. The method includes generating laser light from a surface emitting laser, coupling the laser light into an optical path having a distal end, directing a first portion of the laser light toward a near field transducer located at the distal end, the first portion of laser light exciting the near field transducer to surface plasmonic resonance, diffracting a second portion of the laser light in a direction normal to a direction of the first portion of the laser light, sensing the second portion of diffracted laser light to monitor an output power of the surface emitting laser, and applying an energizing current to a write element to write data to a portion of a media.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

This disclosure is related to the use of a light emitting device disposed in or on a magnetic recording head configured for (e.g., a write coil) heat-assisted magnetic recording (HAMR). In HAMR devices, also sometimes referred to as thermal-assisted magnetic recording (TAMR) devices, heat energy is used in conjunction with magnetic fields applied to a magnetic recording media (e.g., a hard drive disk) to overcome superparamagnetic effects that limit the areal data density of traditional magnetic media. Typically, a HAMR write head also includes a source of energy (e.g., laser) used for heating a small spot on a magnetic media. The laser energy is used to excite a near-field transducer near the magnetic writer to create a precisely focused thermal spot on the magnetic media. The HAMR device uses a magnetic storage media with higher coercivity than conventional magnetic media, and the hotspot temporarily lowers the coercivity so that data can be written to the heated area. This generally allows for higher areal density to be achieved than with current magnetic recording technologies.

It can be useful to monitor the power of the light source, e.g., laser diode, used to heat the medium so that the light source can be carefully controlled. Embodiments discussed herein provide power monitoring for a laser diode used in a HAMR head. In some embodiments, the laser diode includes a grating that directs a portion of the laser light toward a power monitor, e.g., photodiode. Current light collection arrangements for power monitoring have led to inefficiencies as photodiodes are located a distance from the energy source. This disclosure discusses using a grating, e,g, a second order grating, to allow the power monitor photodiode to be disposed in closer proximity to the laser. This arrangement can increase the power monitor's light collection efficiency, thus making the power monitor small enough to improve its dynamic response (bandwidth). The arrangement also reduces the overall submount size as a submount retaining the photodiode can be shortened in length. Additionally, the arrangement can enhance laser stability and reduce noise/relative intensity noise.

Figure 1:
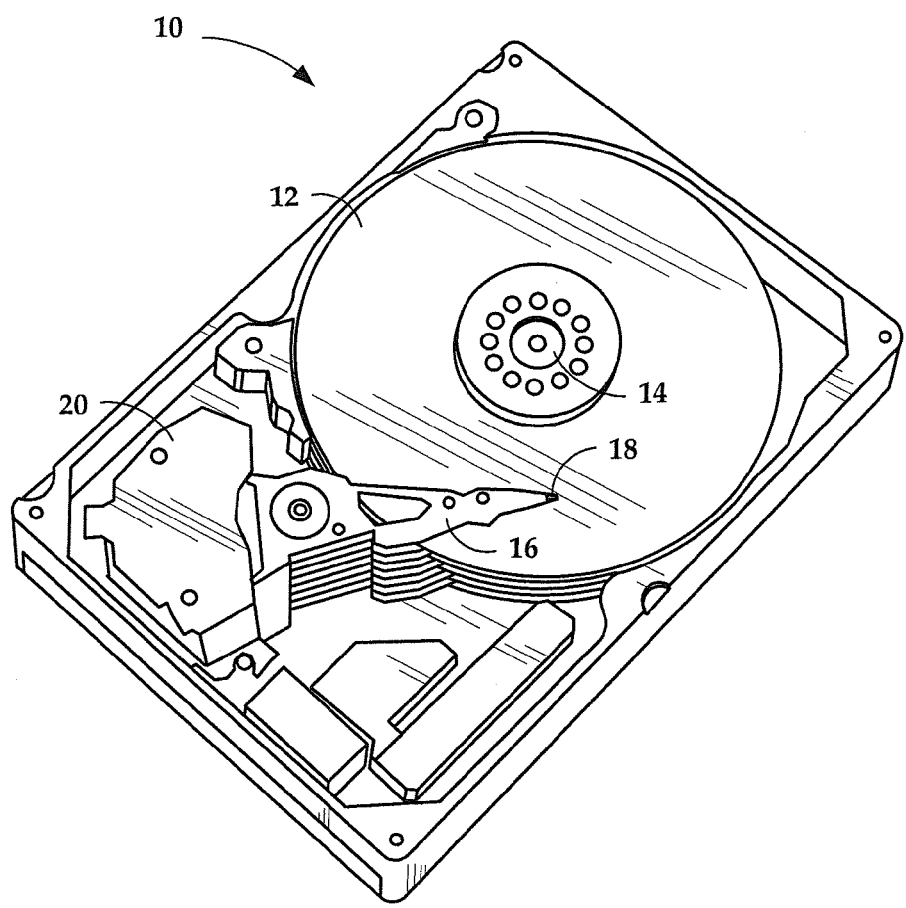
FIG. 1 is a schematic perspective view of a hard drive apparatus that may incorporate any of the heads disclosed herein.

The structures and techniques described herein may be used, for example, in read/write heads of a magnetic data storage device such as hard drive apparatus 10 shown in FIG. 1. The apparatus 10 generally includes at least one magnetic disk 12 that rotates around a spindle axis 14. The apparatus 10 further includes an arm 16 with an end-mounted a transducer head 18 that is positioned over a surface of the disk 12 while reading from or writing to the disk 12. The arm 16 is driven by an actuator 20 to move radially across the disk 12. This movement of the arm 16 positions the transducer head 18 over the disk 12 to read from or write to tracks on the disk 12. A hard drive of this type may include multiple arms 16 and disks 12 arranged in a stack formation, and may include transducer heads that read/write from/to both surfaces of the disks 12.

The transducer head 18 (also referred to as a "slider") may include both magnetic read and write elements. A read element generally operates by detecting a changing magnetic field, e.g., changes in direction of magnetic flux caused by relative motion between an encoded magnetic media and the read element. The read element converts the flux reversals into an electrical analog signal that represents data stored on the media. The write element operates in response to a current sent through a conductor surrounding a write pole, which generates a magnetic field at a tip of the write pole. This magnetic field in turn changes the orientation of a local magnetic field at the surface of the disk 12, causing data to be persistently stored on the disk 12.

In a number of existing HAMR designs, the laser is manufactured separately from the slider that houses the read/write head. The laser can be physically attached to the slider, or attached elsewhere and optically coupled to the slider (e.g., via an optic fiber). The exemplary embodiment described in FIGS. 2a, 2b, and 3 describes a configuration referred to herein as laser-on-slider (LOS) where the laser is physically attached to a submount and the submount is attached to the slider. Other exemplary embodiments described herein describe a configuration referred to as a laser-in-the-slider (LIS) or simply laser-in-slider assembly.

Figure 2A:
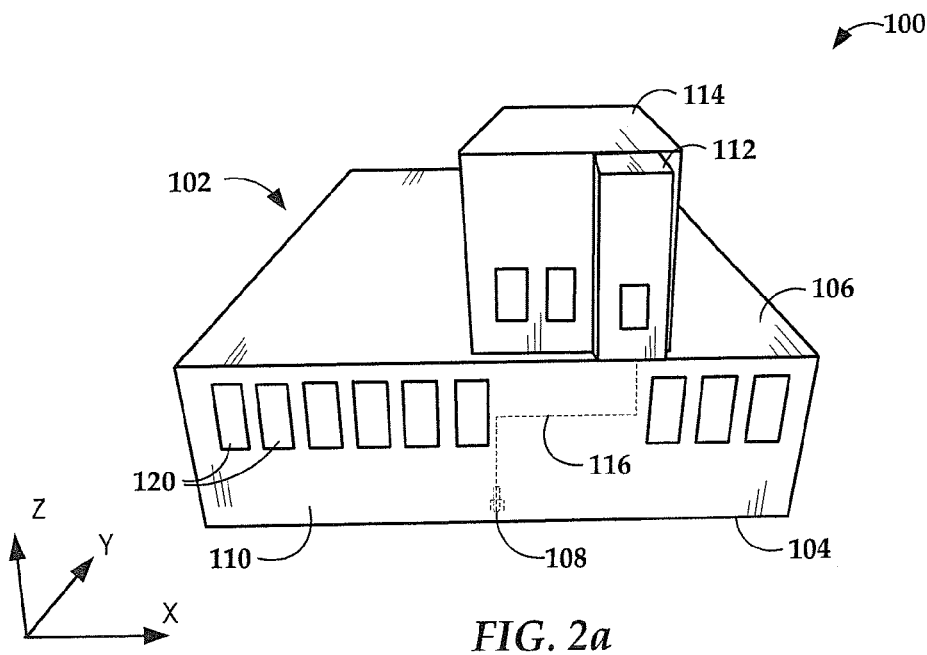
FIG. 2*a* is an elevated perspective view of a laser-on-slider assembly according to an example embodiment.
Figure 2B:
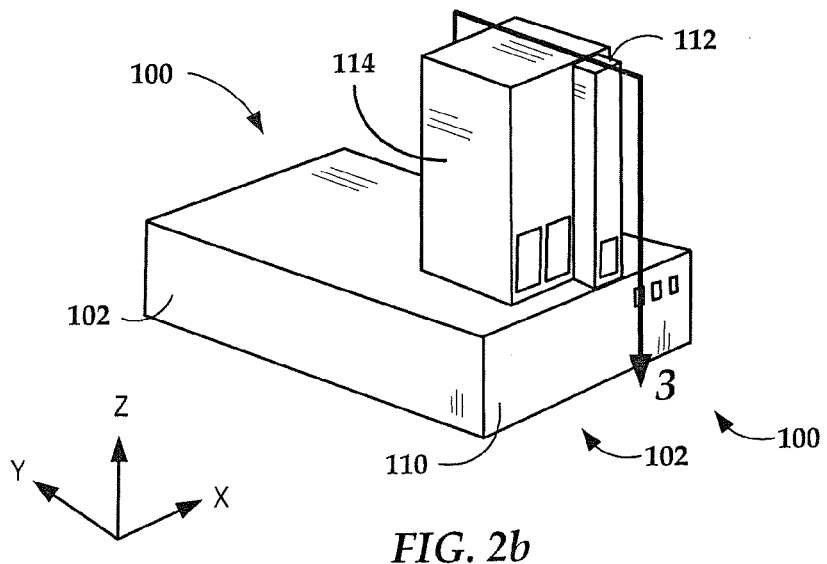
FIG. 2*b* is a perspective view of the laser-on-slider assembly of FIG. 2*a*.

FIGS. 2a and 2b show perspective views of a LOS assembly 100 according to an example embodiment. The assembly 100 includes a slider body 102 having a media-facing first surface 104 and a second top surface 106. The first surface 104 faces a magnetic media surface (e.g., disk surface, not shown) during operation. A read/write head region 108 is located at the first surface 104 near a trailing edge 110 of the slider body 102. The read/write head region 108 includes respective one or more read transducers and write transducers, as well as an optical component (e.g., a near-field transducer) that directs a small beam of energy onto the media surface. The energy is provided by a laser 112 attached to a submount 114. Both the laser 112 and the submount 114 are mounted to the second top surface 106 of the slider body 102.

The laser 112 directs light to an optical interface (not shown) of the slider body 102, where it is coupled to a waveguide 116 that directs light to the read/write head region 108. The laser 112 in this example is a longitudinal cavity, edge-emitting laser diode, and may be coupled to the waveguide 116 via a facet, grating, lens or other coupling structure known in the art. The slider body 102 is an integrated optics device that is formed together with the waveguide 116 and read/write head region 108. The waveguide 116 may be formed as a layer of materials with appropriate relative refractive indices so that light propagates through the waveguide in a manner similar to an optic fiber.

In the embodiment of FIGS. 2a and 2b, the submount 114 extends a distance from the slider body 102. In some embodiments, the submount 114 and the laser 112 have a same height in the z direction of the Cartesian coordinate system illustrated in FIGS. 2a and 2b. The submount 114 provides mechanical and electrical connections between the laser 112, slider body 102, interface board (not shown) and suspension (not shown). The laser 112 and submount 114 may also be formed using integrated optics and/or integrated circuit manufacturing processes. However, in this exemplary embodiment, the laser 112 and submount 114 are not formed together with the slider body 102 in the same layer deposition process. The laser 112 and submount 114 are formed separately and later attached together (e.g., using pick and place then solder reflow bonding) with the slider body 102 to form the assembly 100.

Figure 3:
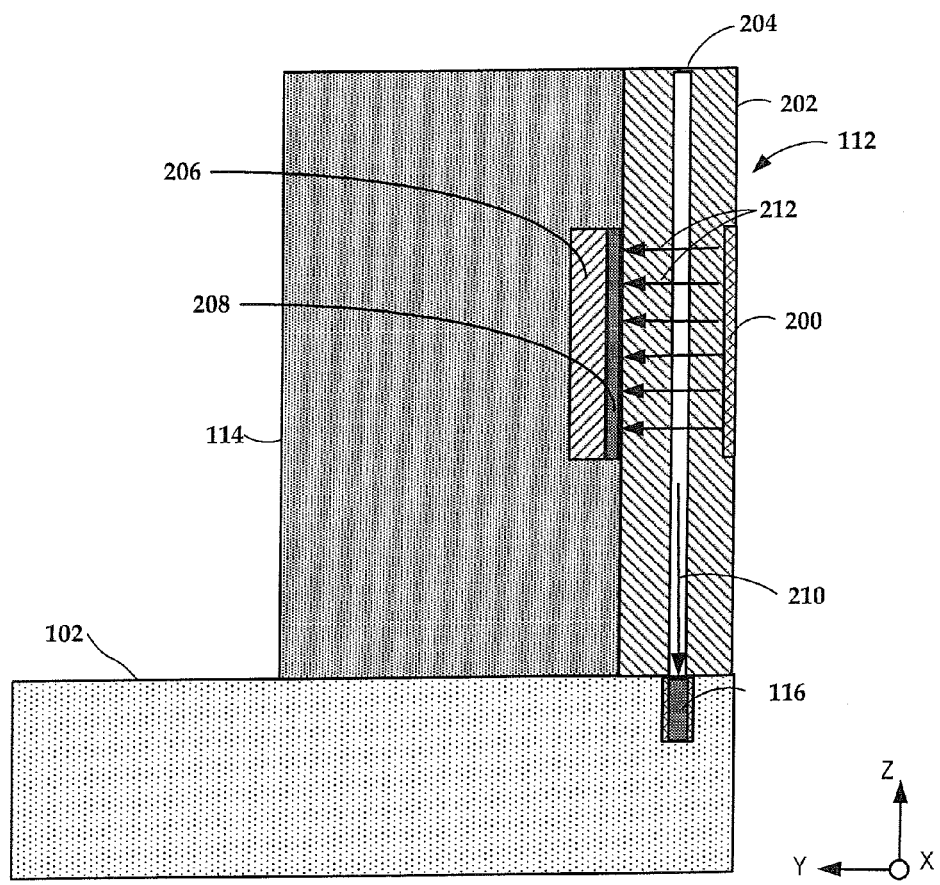
FIG. 3 is a cross-sectional view of the laser-on-slider assembly from FIG. 2*b*.

FIG. 3 is a cross-sectional view of a portion of the slider body 102, laser 112 and submount 114. For simplicity, the components of the laser 112 have been reduced to include only illustrate a grating 200, substrate 202, and an active region 204. Similarly, the submount 114 includes a photodiode 206 and a coating 208.

In FIG. 3, a second order grating 200 is fabricated on a non-lasing surface of the laser 112 (on a cladding of the laser 112). However, in other embodiments the grating can be disposed within the laser 112, for example, within the substrate 202, within the cladding, on a surface of the cladding that faces the active region, or on either side of the active region, for example, between the cavity and wafer or between the cavity and submount The grating 200 is spaced from the active region 204 by components including the substrate 202. The substrate 202 may be the diced portion of an initial crystalline wafer on which a plurality of thin layers are grown, deposited, and/or patterned on a side of the wafer. The layers may include a layer of gain medium which may form one or more quantum wells with adjacent layers, and a p-contact. An n-contact may be deposited or otherwise formed on an opposite side of the substrate 202. The distribution of electrical current flow between the n-contact and p-contact may define the active region 204. Laser light may propagate within the laser 112 generally along the active region 204 before being transferred to the waveguide 116.

In the exemplary embodiment of FIG. 3, the photodiode 206 is located within the submount 114 and is disposed generally between the submount 114 and the laser 112. Photodiode 206 interfaces with submount 114. In various embodiments, photodiode 206 can be fabricated in or attached to submount 114 using know processes. In the embodiment of FIG. 3, photodiode 206 is disposed laterally outward (in the y-direction) of the substrate 202 and has a generally complementary extent in the z-direction with the grating 200. Additionally, the photodiode 206 is spaced from the slider body 102 and waveguide 116. The coating 208, such as an anti-reflective coating, can be disposed over the photodiode 206 between the photodiode 206 and the laser 112. The photodiode 206 or another type of light sensitive sensor such as, for example, a photoconductor, phototransistor, or other type of photodetector that would monitor the laser diode power by sensing an amount of the light produced by the laser 112.

Laser light may propagate within the laser 112 generally along the active region 204 in the z-direction before being transferred to the waveguide 116 from a primary lasing surface of the laser 112. Thus, the laser 112 is adapted to inject light into the waveguide 116 as indicated by arrow 210. The grating 200 is adapted to diffract a portion of the light to the photodiode 206 as indicated by arrow 212.

In the embodiment of FIG. 3, the grating 200 comprises a second order grating that diffracts the portion of light in a direction that is normal to the direction of light traveling along the active region 204. Thus, the grating 200 diffracts the portion of light to travel at substantially 90 degrees to a direction of the light injected into the waveguide 116. The design of the grating 200 including the material, structure, depth, period, and location on or within the laser 112 can be optimized to tailor the amount of light being diffracted to the photodiode 206. In the embodiment of FIG. 3, with the grating 200 mounted on a surface of the laser 112, the grating 200 is adapted to diffract 1 milliwatt or less of light to the photodiode 206 when the front facet output to the waveguide 116 comprises 50 milliwatts. Additionally, if the submount 114 is attached to the laser 112 as illustrated in FIG. 3, it may be desirable for a wavelength of the laser 112 to be less than 900 μmeters.

Figure 4A:
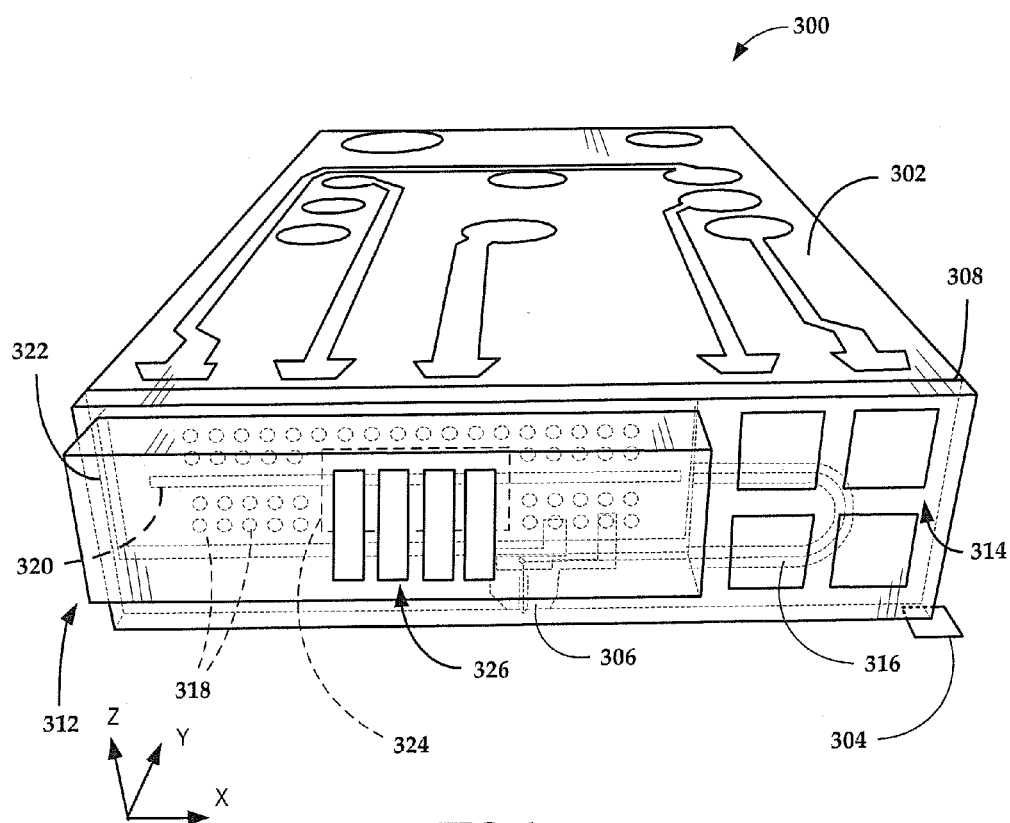
FIG. 4*a* is an elevated perspective view of a laser-in-slider assembly according to an example embodiment.

FIG. 4a is a perspective view of an assembly 300 with a laser-in-slider configuration according to an example embodiment. In this example, an edge-emitting laser 312 is integrated into a trailing edge surface 308 of slider body 302. Laser 312 is disposed adjacent to HAMR read/write head 306, which has an edge on a first surface 304 of the slider body 302. The first surface 304, sometimes referred to as media facing surface or an air bearing surface, is disposed proximate to a moving disk 12 (FIG. 1) during device operation. Laser 312 provides electromagnetic energy to heat the media surface at a point adjacent read/write head 306. Optical coupling components, such as waveguide 316, are formed integrally within slider body 102 to deliver light from 312 to the disk.

In the exemplary example, laser 312 is recessed within a cavity formed in a submount 314 and in a portion of slider body 302. The submount 314 is attached to the slider body 302 as well as the laser 312. Thus, the submount 314 is disposed between the laser 312 and the slider body 302. The bottom of cavity along the submount 314 and laser 312 interface includes solder bumps 318 that facilitate bonding of the laser 312 to the submount 314, and provide electrical connectivity and/or alignment for laser 312.

As previously discussed, laser 312 includes an active region 320 disposed within substrate 322. Active region 320 extends generally laterally along slider body 302 in the x-direction according to the Cartesian coordinate system shown. In addition to the solder bumps 318, the back non-lasing surface of the laser 312 interfaces with a photodiode 324 mounted in the submount 314. The photodiode 324 is spaced from the active region 320 in the y-direction. A grating 326, comprising a second order grating, is attached to an outermost surface of the laser 312. The grating 326 is arranged generally opposite the photodiode 324 such that the grating 326 appears to be superimposed upon photodiode 324 in FIGS. 4a and 4b. However, the grating 326 is spaced from the photodiode 324 in the y-direction.

Figure 4B:
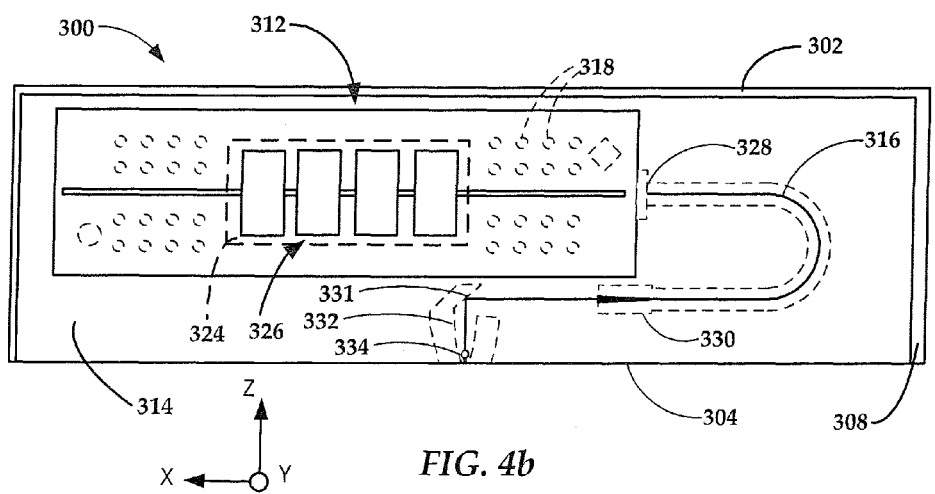
FIG. 4*b* is an end view of the laser-in-slider assembly of FIG. 4*a*.

FIG. 4b shows a more detailed front view of a trailing edge of the assembly 300. FIG. 4b is a front view showing electrical and optical interface features of the assembly 300 that mate with the edge-emitting laser 312. The grating 326, photodiode 324, solder bumps 318, waveguide 316, and first surface 308 shown in FIG. 4b, were previously illustrated and discussed in FIG. 4a. The laser 312 may include an output facet on one end that launches light into an input 328 at a proximate end of waveguide 316 for delivery to a distal end 330 of the waveguide 316. Integrated optics associated with light delivery may include coupling elements, beam expanders, collimators, beam directing elements 311, such as light directing mirrors, focusing elements 332, such as a parabolic solid immersion mirror (PSIM), energy concentrating elements, such as an optical near-field transducer (NFT) 334. As with FIG. 4a, FIG. 4b shows grating 326 disposed on an outer facing surface of laser 312 and grating 326 superimposed upon photodiode 324. However, photodiode 324 is spaced by the active region 320 and substrate 322 from the grating 326.

Figure 5:
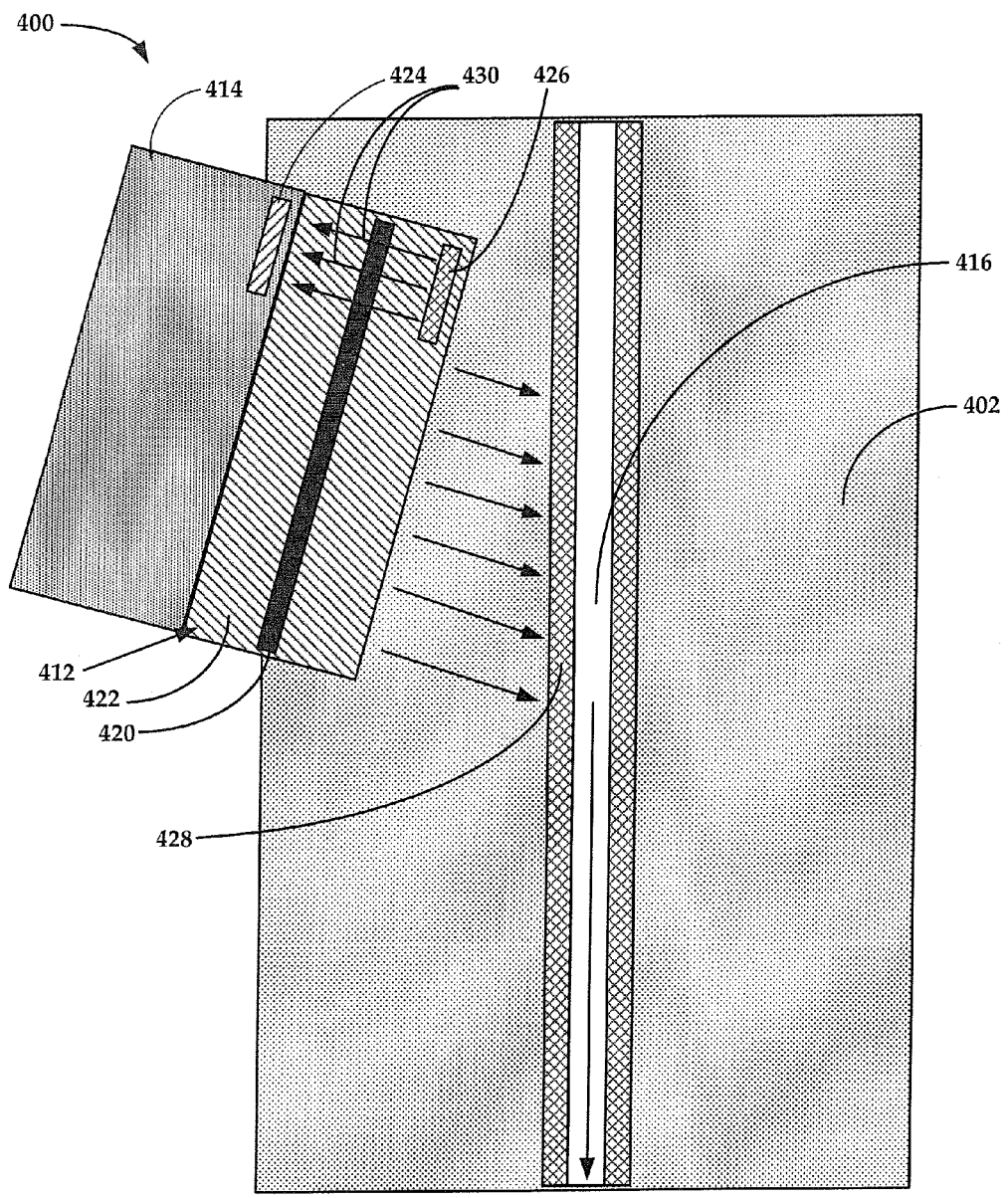
FIG. 5 is a cross-sectional view of a vertical cavity surface emitting laser mounted in a slider according to another example embodiment.

FIG. 5 shows another embodiment of an assembly 400 with a laser-in-slider configuration. The waveguide 416 is disposed within the slider body 402. The waveguide 416 is spaced from a laser 412 in the z-direction of the Cartesian coordinate system. A laser 412 is disposed in the slider body 402 adjacent the waveguide 416. A submount 414 is attached to an exterior facing back surface of the laser 412. Thus, the laser 412 is disposed between the submount 414 and the waveguide 416.

In the exemplary embodiment, the laser 412 comprises a surface emitting laser, such as a vertical cavity surface emitting laser (VCSEL). VCSELs are a type of semiconductor laser in which light is emitted out of a typically circular aperture at either the top or bottom of the device instead of the side as is done with edge-emitting lasers. The geometry of VCSELs reduces manufacturing costs, increases yield and has a number of other advantages including narrower line width, no astigmatism, reduced sensitivity to feedback noise, etc.

The laser 412 includes an active region 420 including known active elements of a VCSEL that are used to produce light. The active region 420 is disposed in a substrate 422. The construction and operation of VCSELs is known and are described in further detail in U.S. Pat. Nos. 8,339,906 and 8,451,695, which are incorporated herein by reference.

A mirror 426 is disposed within the laser 412 and a grating 428 is disposed within the slider body 402 adjacent the waveguide 416. The gratings 426 and 428 can be manufactured using wafer level processing. The grating 428 is adapted to couple light from the laser 412 into the waveguide 416. The laser 412 can be placed directly over the grating 428, as illustrated in FIG. 5. As illustrated, the laser 412 can be mounted at an angle with respect to a grating plane of the grating 428 to control the direction of the light that is coupled into the waveguide 416.

In the exemplary embodiment, the mirror 426 is adapted to reflect a portion of the light from the laser 412 back to a photodiode 424 mounted in the submount 414. The mirror 426 is arranged generally opposite to and interfaces with the photodiode 424 such that light can be directed as indicated by arrow 430.

Figure 6:
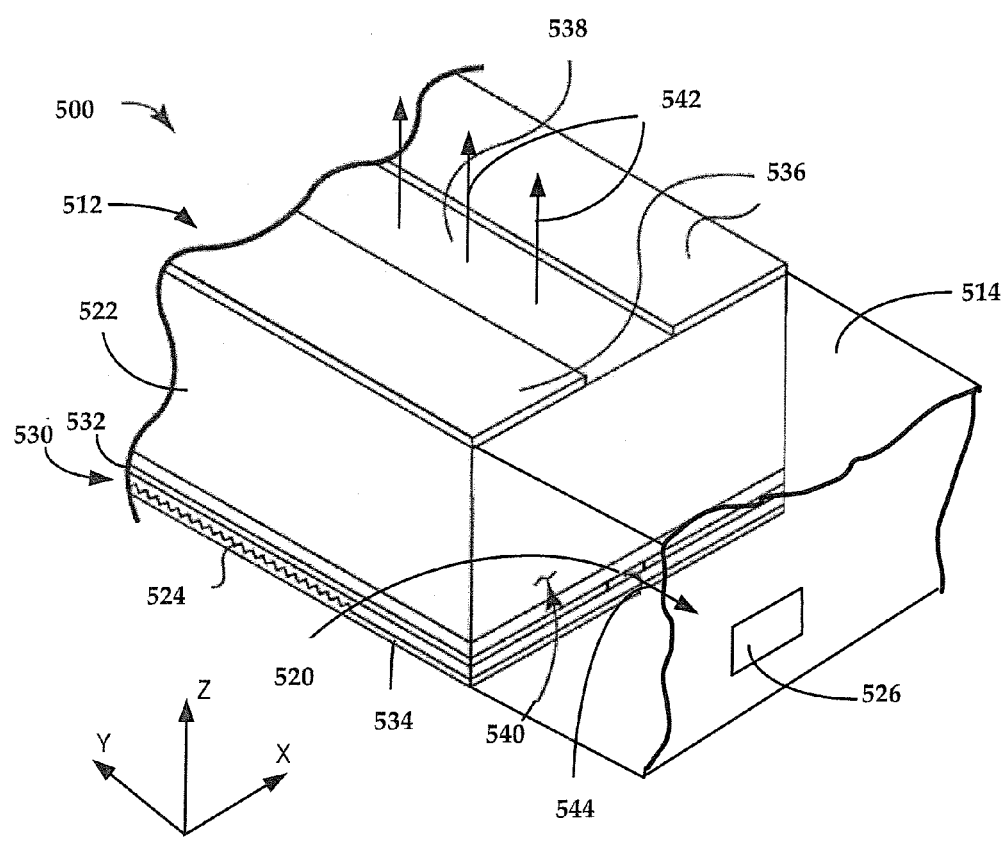
FIG. 6 is a schematic perspective view of a portion of a surface emitting distributed feedback (SE-DFB) semiconductor laser attached to a portion of a submount.

FIG. 6 shows another embodiment of an assembly 500 for a laser-in-slider configuration. FIG. 6 shows a perspective view of a laser 512 attached to a submount 514 but does not illustrate a slider body or waveguide. In FIG. 6, the laser 512 comprises a surface emitting distributed feedback (SE-DFB) semiconductor laser. The laser 512 is illustrated in the context of a Cartesian coordinate system for reference purposes. The substrate 522 is comprised of many layers 530 such as a layer of gain medium 532. A p-contact 534 is disposed on an opposite side of the substrate 522 from an n-contact 536. The distribution of electrical current flow between the n-contact 536 and p-contact 534 defines an active region 520 of the gain medium. Laser light may propagate within the laser 512 generally along the active region 520 between a first end facet 540 and a second end facet (not shown). An output window 538 is disposed adjacent the n-contact 536 to couple light out in the primary lasing direction indicated by arrow 542.

A grating 526 is distributed along at least a portion of the active region 520 between the gain medium 532 and the p-contact 534. The grating 526 comprises a second order grating, and is provided to direct a portion of the light out of the first end facet 540 as illustrated by arrow 544 to a photodiode 524 disposed in the submount 514. Thus, the grating 526 is adapted to diffract a portion of light to travel at substantially 90 degrees to the primary light coupling direction (as indicated by arrow 542).

Figure 7:
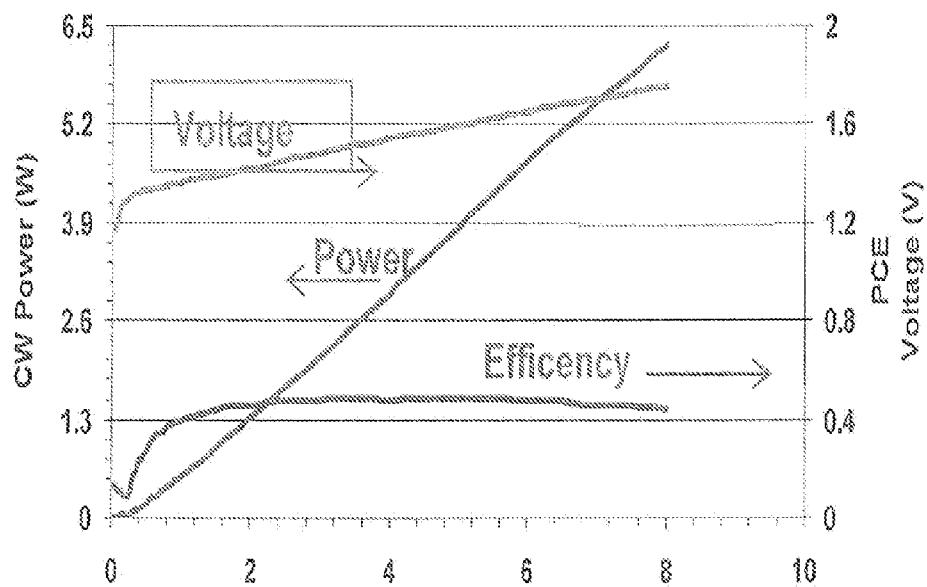
FIG. 7 is showing the measured continuous wave (CW) power, efficiency, and voltage as a function of current for a 120×1500 laser diode having a configuration similar to the laser diode discussed in connection with FIG. 6.

FIG. 7 is a graph showing the measured continuous wave (CW) power, efficiency, and voltage as a function of current for a 120×1500 laser diode having a configuration similar to the laser diode discussed in connection with FIG. 6. The vertical axis illustrates both power conversion efficiency (PCE) and the voltage (volts). The PCE is a measure of the percent of electrical power converted to optical power.

Figure 8:
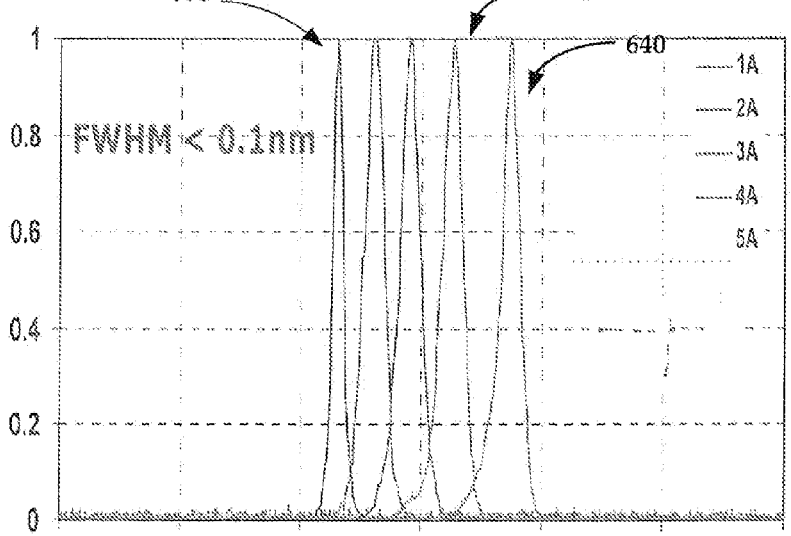
FIG. 8 shows graphs of the CW spectra of SE-DFB device at 1 Amp (A), 2 A, 3 A, 4 A, and 5 A showing that wavelength stabilization can provide full width half maximum (FWHM) outputs less than 0.1 nm.

FIG. 8 shows graphs of the CW spectra of SE-DFB device at 1 Amp (A), 2 A, 3 A, 4 A, and 5 A showing that wavelength stabilization can provide full width half maximum (FWHM) outputs less than 0.1 nm.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A head assembly, comprising:
   a submount;
   a body having a first surface;
   an optical path disposed in the body and adapted to receive light and convey the light to a distal end of the optical path;
   a near field transducer (NFT) disposed adjacent the distal end of the optical path and having an output end proximate the first surface of the body;
   a sensor interfacing with the submount; and
   a laser attached to the submount along a non-primary lasing surface thereof, wherein the laser is adapted to inject light into the optical path and includes a grating adapted to diffract a portion of the light through the non-primary lasing surface to the sensor.

2. The assembly of claim 1, further comprising a magnetic write pole, the optical path and the NFT being disposed proximate the write pole.

3. The assembly of claim 1, wherein the sensor is disposed within the submount between the submount and the laser.

4. The assembly of claim 1, wherein the laser is disposed in the body and the submount is mounted only to the laser.

5. The assembly of claim 1, wherein the submount has a same length as the laser.

6. The assembly of claim 1, wherein the grating comprises a second order grating.

7. The assembly of claim 1, wherein the grating diffracts the portion of light to travel at substantially 90 degrees to a direction of the light injected into the optical path.

8. The assembly of claim 1, wherein the grating is disposed on a surface of the laser over a cladding.

9. The assembly of claim 1, wherein the assembly comprises a laser-in-slider configuration, and wherein the laser comprises one of a surface emitting distributed feedback laser and a vertical cavity surface emitting laser.

10. The assembly of claim 8, wherein the assembly comprises an arrangement where the submount is mounted to the laser and the body such that the submount is disposed between the laser and the body.

11. The assembly of claim 1, wherein the assembly comprises a laser-on-slider configuration.

12. A heat assisted magnetic recording device, comprising:
    a slider body;
    a read/write element disposed proximate the slider body and configured to apply a magnetic field to write data on a portion of a heat-assisted magnetic recording medium in response to an energizing current;
    a submount attached to the slider body;
    a photodiode interfacing with the submount; and
    a laser attached to the submount and disposed above the photodiode, wherein the laser is adapted to inject light proximate the read/write element and includes a grating adapted to diffract a portion of the light to the photodiode.

13. The device of claim 12, wherein the submount has a same length as the laser.

14. The device of claim 12, wherein the grating comprises a second order grating.

15. The device of claim 12, wherein the device utilizes a laser-in-slider configuration, and wherein the laser comprises one of a surface emitting distributed feedback laser or a vertical cavity surface emitting laser.

16. The device of claim 12, wherein the device utilizes a laser-on-slider configuration.

17. The device of claim 12, wherein the grating is disposed on a cladding of the laser.

18. A method, comprising:
    generating laser light from a laser diode, the laser diode comprising a grating;
    coupling the laser light into an optical path having a distal end;
    directing a first portion of the laser light toward a near field transducer (NFT) located at the distal end, the first portion of laser light exciting the near field transducer to surface plasmonic resonance;
    diffracting a second portion of the laser light with the grating in a direction normal to a direction of the first portion of the laser light;
    sensing the second portion of diffracted laser light to monitor an output power of the laser diode; and
    applying an energizing current to a write element to write data to a portion of a media.

19. The method of claim 18, wherein the laser diode is mounted on a head that comprises a waveguide and the NFT, and wherein the NFT is configured to provide electromagnetic heating to a medium spaced apart from the head.

20. The method of claim 18, further comprising providing a submount for the laser diode, wherein the submount has a same length as the laser diode.

* * * * *